US006266613B1

(12) United States Patent
Nimura et al.

(10) Patent No.: US 6,266,613 B1
(45) Date of Patent: *Jul. 24, 2001

(54) NAVIGATION APPARATUS FOR A VEHICLE

(75) Inventors: Mitsuhiro Nimura, Okazaki; Yasunobu Ito; Hiroyoshi Masuda, both of Anjo; Takeshi Yano, Okazaki, all of (JP)

(73) Assignee: Aisin Aw Co., Ltd., Anjo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/714,808

(22) Filed: Sep. 17, 1996

(30) Foreign Application Priority Data

| Oct. 4, 1995 | (JP) | 7-258039 |
|---|---|---|
| Oct. 4, 1995 | (JP) | 7-282625 |

(51) Int. Cl.[7] .................................................. G01C 21/34
(52) U.S. Cl. .......................... 701/210; 701/209; 340/990; 340/995
(58) Field of Search .................................. 701/200, 207, 701/208, 209, 210, 211; 73/178 R; 340/988, 990, 995

(56) References Cited

U.S. PATENT DOCUMENTS

| 4,504,913 | | 3/1985 | Miura et al. | 340/990 |
|---|---|---|---|---|
| 4,527,155 | | 7/1985 | Yamaki et al. | 340/990 |
| 4,532,514 | | 7/1985 | Hatano et al. | 340/995 |
| 4,543,572 | | 9/1985 | Tanaka et al. | 340/995 |
| 4,638,438 | | 1/1987 | Endo et al. | 340/995 |
| 4,796,189 | | 1/1989 | Nakayama et al. | 340/990 |
| 5,184,303 | * | 2/1993 | Link | 701/210 |
| 5,303,159 | | 4/1994 | Tamai et al. | 340/990 |
| 5,508,930 | * | 4/1996 | Smith, Jr. | 701/207 |
| 5,612,881 | * | 3/1997 | Moroto et al. | 701/209 |
| 5,652,706 | * | 7/1997 | Morimoto et al. | 701/210 |
| 5,659,476 | * | 8/1997 | Lefebvre et al. | 701/210 |
| 5,757,289 | * | 5/1998 | Nimura et al. | 701/210 |
| 5,787,383 | * | 7/1998 | Moroto et al. | 701/210 |
| 5,821,880 | * | 10/1998 | Morimoto et al. | 701/210 |
| 6,061,629 | * | 5/2000 | Yano et al. | 701/209 |

FOREIGN PATENT DOCUMENTS

| 0 126 456 | 11/1984 | (EP) . |
|---|---|---|
| 542-331 | 5/1993 | (EP) . |
| 588-082 | 3/1994 | (EP) . |
| 1-173298 | 7/1989 | (JP) . |
| 2-3899 | 1/1990 | (JP) . |
| 2-75909 | 3/1990 | (JP) . |
| 5-165407 | 7/1993 | (JP) . |
| WO-A-93/13385 | 7/1993 | (WO) . |

* cited by examiner

Primary Examiner—Gary Chin
(74) Attorney, Agent, or Firm—Oliff & Berridge, PLC

(57) ABSTRACT

In a navigation apparatus for a vehicle, an entire route from a start point to a destination is determined and the vehicle is guided to the destination in accordance with the determined route. In the navigation apparatus, an entire route from a start point to a destination is first determined. Route determination is performed for a part of the entire route in accordance with a request of a user, and the entire route to the destination is determined again based on the result of the determination performed for the part of the entire route. The navigation apparatus has a first remaining-distance displaying unit and a second remaining-distance displaying unit. The first remaining distance display unit displays an arrow indicating the route and the remaining distance to an intersection. The second remaining-distance display unit deletes the display of the distance provided by the first remaining-distance display unit and changes the length of the arrow, which indicates the route, as the vehicle advances.

3 Claims, 13 Drawing Sheets

Fig. 3 (a)
INTERSECTION DATA

| NUMBER OF INTERSECTIONS (n) | |
|---|---|
| 1 | INTERSECTION NUMBER |
|  | COORDINATES OF INTERSECTION (LONGITUDE, LATITUDE) |
|  | CONNECTION ROAD INFORMATION |
|  | ADDRESS AND SIZE OF LANDMARK DATA |
| ⋮ | |
| n | |

Fig. 3 (b)
LANDMARK DATA

| NUMBER OF LANDMARKS (m) | |
|---|---|
| 1 | COORDINATES OF LANDMARK (LONGITUDE, LATITUDE) |
|  | MARK PATTERN NUMBER |
|  | ROAD NUMBER ALONG WHICH LANDMARK EXISTS |
| ⋮ | |
| m | |

Fig. 3 (c)
MARK PATTERN DATA

0 : GRAPHIC DATA OF AA BANK MARK

1 : GRAPHIC DATA OF BB BANK MARK

2 : GRAPHIC DATA OF CC BANK MARK

3 : GRAPHIC DATA OF DD GAS STATION MARK

4 : GRAPHIC DATA OF EE GAS STATION MARK

| ROAD NUMBER | ROAD NUMBER OF ROAD HAVING THE SAME START POINT | ROAD NUMBER OF ROAD HAVING THE SAME END POINT | START POINT | END POINT | NODE SERIES POINTER | ROAD LENGTH (m) | LANDMARK NUMBER |
|---|---|---|---|---|---|---|---|
| ① | ⑪ | ④ | II | I | A000 | 1000 | |
| ② | ③ | ⑫ | I | II | A0A0 | 1000 | |
| ③ | ② | ⑥ | I | IV | A0B3 | 2000 | |
| ④ | ⑤ | ① | IV | I | A0C0 | 2000 | |
| ⑤ | ⑧ | ⑤ | IV | III | A0DE | 1500 | |
| ⑥ | ⑥ | ⑦ | III | IV | A101 | 1500 | |
| ⑦ | ⑫ | ⑩ | V | IV | A201 | 800 | |
| ⑧ | ⑨ | ⑪ | IV | V | A221 | 800 | |
| ⑨ | ④ | ⑨ | IV | VII | A253 | | |
| ⑩ | ⑩ | ③ | VII | IV | A260 | | |
| ⑪ | ① | ⑬ | II | V | A265 | | |
| ⑫ | ⑭ | ② | V | II | A28B | | |
| ⑬ | ⑬ | ⑧ | VI | V | A2A0 | | |
| ⑭ | ⑦ | ⑭ | V | VI | A2B0 | | |

Fig. 5 (a)
GUIDANCE ROAD DATA

| NUMBER OF ROADS (n) | |
|---|---|
| 1 | ROAD NUMBER |
| | LENGTH |
| | ROAD ATTRIBUTE DATA |
| | ADDRESS AND SIZE OF SHAPE DATA |
| | ADDRESS AND SIZE OF GUIDANCE DATA |
| | . |
| | . |
| | . |
| | . |
| n | |
| | |
| | |

Fig. 5 (b)
SHAPE DATA

| NUMBER OF NODES (m) | |
|---|---|
| 1 | LONGITUDE |
| | LATITUDE |
| | . |
| | . |
| | . |
| m | |

Fig. 5 (c)
GUIDANCE DATA

| INTERSECTION NAME |
|---|
| PRESENCE/ABSENCE OF TRAFFIC SIGNAL |
| LANDMARK DATA |
| CAUTION POINT DATA |
| ROAD NAME |
| ADDRESS AND SIZE OF ROAD NAME VOICE DATA |
| ADDRESS AND SIZE OF PLACE – TO – GO DATA |

Fig. 5 (d)
PLACE – TO – GO DATA

| NUMBER OF PLACES TO GO (k) | |
|---|---|
| 1 | ROAD NUMBER OF PLACE TO GO |
| | NAME OF PLACE TO GO |
| | ADDRESS AND SIZE OF PLACE – TO – GO NAME VOICE DATA |
| | DIRECTION – TO – GO DATA |
| | TRAVEL GUIDANCE DATA |
| | . |
| | . |
| | . |
| k | |
| | |
| | |
| | |

Fig. 5 (e)
DIRECTION – TO – GO DATA

- 1 = INVALID
0 = UNNECESSARY
1 = STRAIGHT
2 = RIGHTWARD DIRECTION
3 = RIGHTWARD DIRECTION WITH ANGLE
4 = RIGHTWARD RETURN DIRECTION
5 = LEFTWARD DIRECTION
6 = LEFTWARD DIRECTION WITH ANGLE
7 = LEFTWARD RETURN DIRECTION

Fig. 6 (a)
ROAD ATTRIBUTE DATA

INFORMATION REGARDING PRESENCE/ABSENCE (PRESENCE : O)

| | | |
|---|---|---|
| ELEVATED/ UNDERGROUND DATA | ELEVATED ROAD | |
| | ADJACENT TO ELEVATED ROAD | |
| | UNDERGROUND ROAD | O |
| | ADJACENT TO UNDERGROUND ROAD | |
| NUMBER OF LANES | THREE OR MORE LANES | |
| | TWO LANES | O |
| | ONE LANES | |
| | NO CENTERLINE | |

Fig. 6 (b)
ROAD NAME DATA

| ROAD TYPE | SUB-TYPE NUMBER |
|---|---|

| | | |
|---|---|---|
| FREEWAY | MAIN ROAD | 1 |
| | CONNECTION ROAD | 2 |
| URBAN FREEWAY | MAIN ROAD | 3 |
| | CONNECTION ROAD | 4 |
| TOLL ROAD | MAIN ROAD | 5 |
| | CONNECTION ROAD | 6 |
| NATIONAL ROAD | | 7 |
| PREFECTURAL ROAD | | 8 |
| OTHERS | | 9 |

Fig. 6 (c)
CAUTION POINT DATA

| | |
|---|---|
| RAILWAY CROSSING | O |
| ENTERANCE OF TUNNEL | |
| EXIT OF TUNNEL | |
| ROAD WIDTH DECREASING POINT | |
| NONE | |

Fig. 6 (d)
TRAVEL GUIDANCE DATA

| | |
|---|---|
| OFFSET RIGHTWARD | |
| OFFSET LEFTWARD | |
| AT THE CENTER | O |
| NONE | |

Fig. 9 (a)
POINT DATA

|  | NUMBER OF POINTS (n) |
|---|---|
| 1.<br>START POINT | POSITION |
|  | GUIDANCE REQUIRED/<br>NOT REQUIRED |
|  | ROUTE DETERMINING<br>CONDITIONS |
|  | ROUTE NUMBER |
| 2.<br>ENROUTE<br>POINT 1 |  |
|  |  |
| ⋮ |  |
| n.<br>DESTINATION |  |

Fig. 9 (b)
ROUTE DATA

|  | NUMBER OF ROUTES (m) |
|---|---|
| 1. | ROUTE START POINT |
|  | ROUTE END POINT |
|  | ROUTE DETERMINING<br>CONDITIONS |
|  | ROUTE INFORMATION<br>⋮ |
| 2. |  |
| ⋮ |  |
| m. |  |

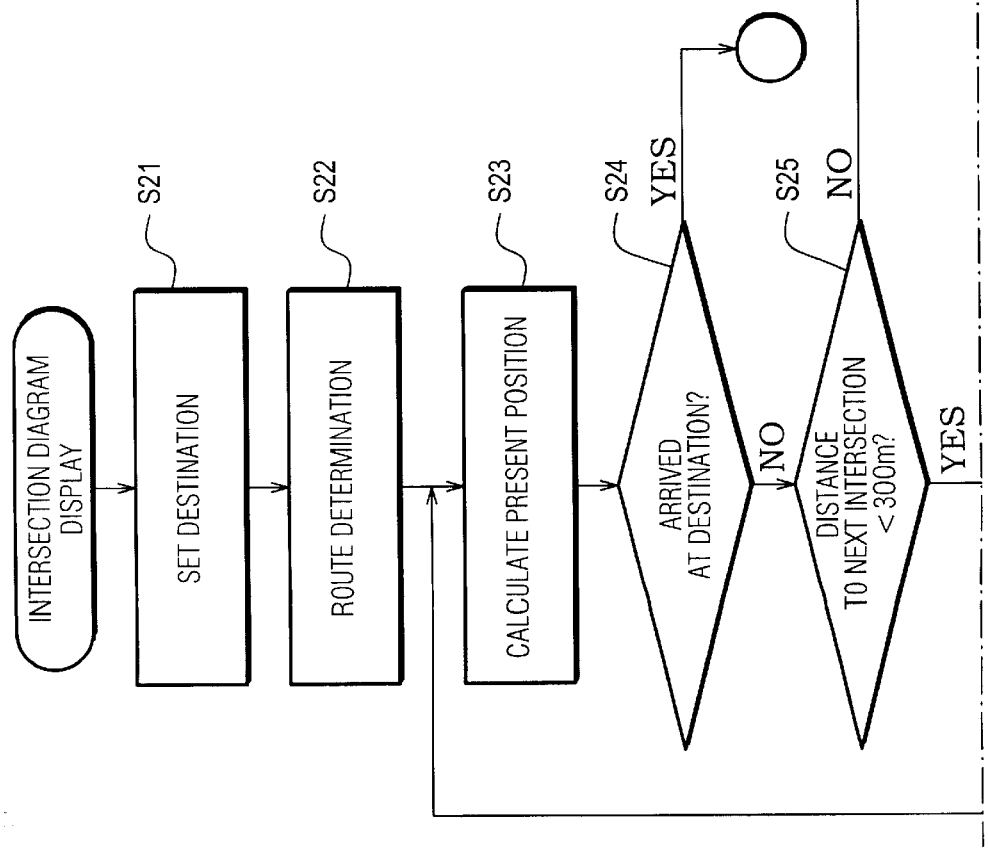
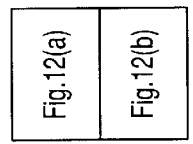

NAVIGATION APPARATUS FOR A VEHICLE

BACKGROUND OF THE INVENTION

1. Field of the Invention

The invention relates to a navigation apparatus for a vehicle which determines a route to a destination, and which provides route guidance while the vehicle travels.

The invention also relates to a navigation apparatus for a vehicle which determines the shortest route from a start point to a destination, and to a method of displaying intersections which promotes smooth traveling in the vicinity of the intersections.

2. Description of Related Art

Conventionally, there has been proposed a navigation apparatus which determines a route to a destination from either a start point or the present position of a vehicle, and which guides the vehicle to the destination in accordance with the determined route (see Japanese Patent Application Laid-open (kokai) No. 2-75909).

Also, there has been proposed an improved navigation apparatus in which there is designated at least one enroute point between a start point and a destination, and in which route-determination is performed while taking the enroute point(s) into consideration. For example, when points A and B between a start point and a destination are designated as enroute points, a route between the start point and the enroute point A, a route between the enroute points A and B, and a route between the enroute point B and the destination are determined. As a result, the user is provided with a single continuous route which starts from the start point and reaches the destination via the enroute points A and B (see Japanese Patent Application Laid-open (kokai) No. 23899).

However, the possibility exists that the user is not satisfied with a route which is provided by the system based on the enroute points designated in the above-described manner. To overcome this drawback, there has been proposed a technique as disclosed in Japanese Patent Application Laid-open (kokai) No. 5-165407. In this technique, if the user is not satisfied with a route which is provided by the system based on costs of the routes, there is performed a processing for increasing the apparent segment cost of the system chosen route and then determining a route which has the smallest segment cost so as to provide a route different from the previously determined route.

However, even when the route different from the previously determined route is calculated, it is not necessarily possible to obtain a route which satisfies the user with only one recalculation. Also, since the recalculation is performed for the entire route from the start point to the destination, a prolonged period of time is required to complete the route determination. In the above-described case, even when the user is satisfied with the entire route except for the route between the enroute points A and B, for example, the system changes the entire route including the route between the start point to the enroute point A and the route between the enroute point B and the destination with which the user is satisfied. This occurs because the system performs route determining processing after increasing the apparent segment cost of the previously determined route. Accordingly, it is impossible to provide a route with which the user is satisfied. This is especially true in an initial route determination in which the entire route from a starting point to a destination is determined, the calculation time increases as the distance to the destination increases. This, obviously, is not a preferable characteristic of a navigation system.

Also, there has been known a method of guiding a vehicle at each intersection, according to which an enlarged map of the vicinity of each intersection is stored in the form of graphic data, and the enlarged map of the vicinity of the intersection is displayed together with an arrow.

Moreover, various kinds of navigation apparatuses for vehicles have recently been proposed (e.g., Japanese Patent Application Laid-Open (kokai) Nos. 1-173298 and 2-75909).

However, the intersection displays provided by these navigation apparatuses are not satisfactory, because their displays are not changed in fine increments as the vehicle proceeds.

SUMMARY OF THE INVENTION

An object of the invention is to solve the above-mentioned problems in the conventional navigation apparatus, and to provide a navigation apparatus which can provide an optimal route to a user through simple operation performed within a shortened calculation time.

Another object of the invention is to provide a method of displaying each intersection which can change the display of each intersection in accordance with actual progress of the vehicle toward the intersection, thereby providing fine guidance, which promotes comfortable and smooth travel.

To achieve the above objects, the invention provides a navigation apparatus for a vehicle in which an entire route from a start point to a destination is determined and the vehicle is guided to the destination in accordance with the determined route. The navigation apparatus comprises means for determining an entire route from a start point to a destination, means for performing route determination for a part of the entire route in accordance with a request of a user, and means for newly determining the entire route to the destination based on the result of the determination performed for the part of the entire-route.

The invention also provides a navigation apparatus for a vehicle, which comprises information storage means for storing information regarding roads and intersections, present position detecting means for detecting the present position of the vehicle, destination setting means for setting a destination, enroute point setting means for setting enroute points to be passed through, route calculating means for calculating a route to the destination set by the destination setting means based on the information stored in the information storage means and the enroute points set by the enroute point setting means, route storage means for storing the route calculated by the route calculating means, and route guidance means for providing route guidance based on the route calculated by the route calculating means and the present position detected by the present position detecting means. The route storage means stores a route for each section between enroute points, and the route calculating means is capable of performing partial route calculation for each section between the enroute points.

The invention further provides a navigation apparatus for a vehicle, which comprises information storage means for storing information regarding roads and intersections, present position detecting means for detecting the present position of the vehicle, destination setting means for setting a destination, enroute point setting means for setting enroute points to be passed through, route calculating means for calculating, based on information stored in the information storage means, a route for each of sections between the present position of the vehicle detected by the present position detecting means, the enroute points set by the enroute point setting means and the destination set by the destination setting means, route storage means for storing the routes calculated by the route calculating means, and route change directing means for directing to change the route for each of the sections. The route calculation means is provided with route recalculation means for performing recalculation for a section which is designated to be changed, and route editing means for editing the entire route from the present position of the vehicle to the destination based on the route stored in the route storage means and the route obtained through the recalculation performed by the route recalculation means. The route storage means stores the route edited by the route editing means and is provided with route guidance means for providing route guidance based on the route stored in the route storage means and the present position of the vehicle detected by the present position detecting means.

The invention further provides a navigation apparatus for a vehicle, which comprises first remaining-distance display means for displaying the distance between the vehicle and an intersection in a part of a display screen and for displaying an arrow indicating a route when the distance between the vehicle and the intersection decreases to a first predetermined distance, and second remaining-distance display means for deleting the display of the distance and for shortening the length of the arrow (which indicates the route) as the vehicle advances when the distance between the vehicle and the intersection decreases to a second predetermined distance.

Preferably, the arrow displayed by the second remaining-distance display means has a color different from that of the arrow displayed by the first remaining-distance display means.

The invention further provides a navigation apparatus for a vehicle, which comprises information storage means for storing map information, present position detecting means for detecting the present position of the vehicle, input means for inputting at least a destination and route determining conditions, route calculating means for calculating a route to the destination based on the map information stored in the information storage means and in accordance with the information input by the input means, route storage means for storing the route calculated by the route calculating means, and route guidance means for providing route guidance by reading out route information from the route storage means based on the present position detected by the present position detecting means. The route guidance means comprises first remaining-distance display means for displaying the remaining distance to an intersection when the distance between the present position and the intersection decreases to a first predetermined distance, and second remaining-distance display means for displaying the remaining distance to the intersection in a manner different from that of the first remaining-distance display means when the distance between the present position and the intersection decreases to a second predetermined distance.

Preferably, the first remaining-distance display means displays the arrow indicating the route and the remaining distance to an intersection, and the second remaining distance display means deletes the display of the distance provided by the first remaining-distance display means and changes the length of the arrow (which indicates the route) as the present position moves.

Preferably, the display provided by the second remaining-distance display means is an arrow which has a color different from that of the arrow displayed by the first remaining-distance display means.

In the navigation apparatus of the invention having the above-described structure, a portion of the determined route can be subjected to re-determination in accordance with the user's intention. Therefore, the modification of the route can be completed within a shortened period of time. That is, it is possible to set enroute points, to store a route for each section between the enroute points, and to edit the route. Therefore, the entire route to a destination can be determined in a shortened period of time by performing re-determination for each section between the enroute points. Moreover, since conditions used for route determination can be set by setting conditions for each of the sections between the enroute points, it is possible to calculate a route close to a route desired by a user and to provide it to the user.

In the navigation apparatus of the invention, the display of an intersection diagram is changed in accordance with advancement of the vehicle toward the intersection so as to provide sophisticated display suitable for the actual travel of the vehicle. This promotes comfortable and smooth travel.

These and other features and advantages of this invention are described in or apparent from the following detailed description of the preferred embodiments.

BRIEF DESCRIPTION OF THE DRAWINGS

The structure and features of the navigation apparatus for a vehicle according to the present invention will be readily appreciated as the same becomes better understood by referring to the drawings, in which:

FIG. 3(a) is an explanatory diagram showing intersection data of the navigation apparatus of the invention;

FIG. 3(b) is an explanatory diagram showing landmark data of the navigation apparatus of the invention;

FIG. 3(c) is an explanatory diagram showing mark pattern data of the navigation apparatus of the invention;

FIG. 4 is an explanatory diagram showing road/route determination data of the navigation apparatus of the invention;

FIG. 5(a) is an explanatory diagram showing guidance road data of the navigation apparatus of the invention;

FIG. 5(b) is an explanatory diagram showing shape data of the navigation apparatus of the invention;

FIG. 5(c) is an explanatory diagram showing guidance data of the navigation apparatus of the invention;

FIG. 5(d) is an explanatory diagram showing place-to-go data of the navigation apparatus of the invention;

FIG. 5(e) is an explanatory diagram showing direction-to-go data of the navigation apparatus of the invention;

FIG. 6(a) is an explanatory diagram showing road attribute data of the navigation apparatus of the invention;

FIG. 6(b) is an explanatory diagram showing road name data of the navigation apparatus of the invention;

FIG. 6(c) is an explanatory diagram showing caution point data of the navigation apparatus of the invention;

FIG. 6(d) is an explanatory diagram showing travel guidance data of the navigation apparatus of the invention;

FIG. 9(a) is a diagram showing point data for route redetermination of the navigation apparatus according to the embodiment of the invention;

FIG. 9(b) is a diagram showing route data for route redetermination of the navigation apparatus according to the embodiment of the invention;

DESCRIPTION OF THE PREFERRED EMBODIMENTS

Embodiments of the invention will next be described in detail with reference to the drawings.

Figure 1:
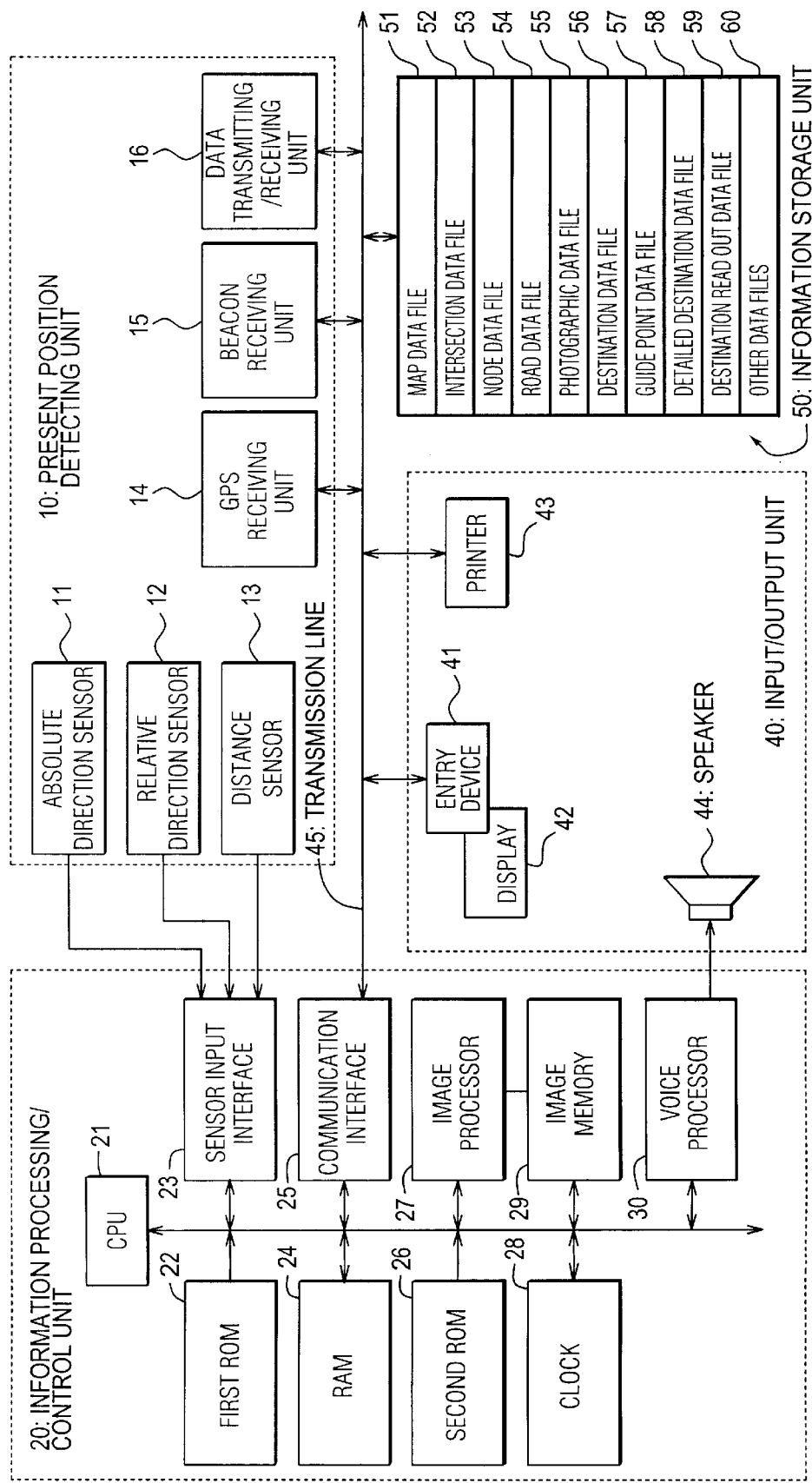
FIG. 1 is a block diagram of a navigation apparatus to which the invention is applied.

FIG. 1 shows a block diagram of a navigation apparatus to which the invention is applied.

This navigation apparatus is designed to be installed into a vehicle, and consists of a present position detecting unit 10, an information processing/control unit 20, an input/output unit 40, and an information storage unit 50.

The present position detecting unit 10 includes the following components:

An absolute direction sensor 11 is a geomagnetic sensor which detects the heading direction of a vehicle through detection of the direction of the N-pole of a magnet. The absolute direction sensor 11 may be another type of sensing means that can detect the absolute direction.

A relative direction sensor 12 detects a variation in the heading direction of the vehicle while it is turning, for example at an intersection, and may be an optical rotary sensor or a rotary-type variable resistor mounted to a rotary portion of a steering wheel, or an angle sensor attached to a wheel portion. Also, it is possible to use a gyro sensor which detects angular variations utilizing the angular velocity. In other words, any sensing means which can detect variations in the relative angle with respect to a reference angle (absolute direction) may be used as the relative direction sensor 12.

A distance sensor 13 is a sensor which detects the distance traveled by detecting and counting the rotation of a wheel, or a sensor which detects an acceleration and subjects the acceleration to double integration. However, any sensing means which can measure a traveling distance of the vehicle may be used as the distance sensor 13.

A GPS (Global Positioning System) receiving unit 14 receives a signal from an artificial satellite. The GPS receiving unit 14 can obtain various kinds of information such as the transmission time of each signal, position of the receiving unit, the moving velocity of the receiving unit, and the heading direction of the receiving unit. A beacon receiving unit 15 receives signals transmitted from a transmitting apparatus disposed at a specific location. More specifically, the beacon receiving unit 15 can obtain VICS information, which makes it possible to obtain information related to travel of the vehicle, such as information regarding traffic congestion, information regarding the present position, and information regarding parking lots.

A data transmitting/receiving unit 16 communicates with devices and facilities outside the vehicle so as to exchange information. This is used with, for example, automobile phones, ATIS, VICS,.GPS compensation, and inter-vehicle communication. The data transmitting/receiving unit 16 can receive and send information regarding the travel.

The information processing/control unit 20 performs various kinds of calculation and control based on both information input through the present position detecting unit 10 and the input/output device 40 as well as information stored in the information storage unit 50, and outputs the results of calculation to output means such as a display 42, a printer 43, or a speaker 44.

The information processing/control unit 20 includes the following components:

A central processing unit (CPU) 21 performs general calculation and control for the entire navigation apparatus. A first ROM 22 stores therein programs related to navigation; specifically, various kinds of navigation programs related to detection of the present position, route determination, and display/guidance. A sensor input interface 23 receives information supplied from the present position detecting unit 10.

A RAM 24 stores therein various kinds of information input by a user through an entry device 41, which will be described later. Examples of such information include information regarding a destination and information regarding enroute points. The RAM 24 also stores the result of calculation which is performed by the CPU 21 based on the information input by the user, a determined route, and map information read out from the information storage unit 50. A communication interface 25 inputs and outputs various kinds of information. The communication interface 25 inputs information from the outside such as information supplied from the present position detecting unit 10.

A second ROM 26 stores therein various kinds of programs related to navigation, such as a navigation program for voice guidance. An image processor 27 serves as processing means for converting vector information provided by the CPU 21 to image information. A clock 28 provides clocking time. An image memory 29 serves as means for storing therein image information obtained by the image processor 27. A voice processor 30 processes voice information read out from the information storage unit 50 and outputs voice messages to the speaker 44 of the input/output unit 40.

The input/output unit 40 has an entry device 41 for inputting various kinds of data such as a destination, enroute points, and route determining conditions. The entry device 41 is, for example, a touch screen, a touch switch, a joystick or a key switch. The input/output device 40 further includes the display 42 for displaying images, the printer 43 for printing information, and the speaker 44 for outputting voice information.

The information storage unit 50 is connected to the information processing/control unit 20 via a transmission line 45. The information storage unit 50 stores therein a map data file 51, an intersection data file 52, a node data file 53, a road data file 54, a photographic data file 55, a destination data file 56, a guide point data file 57, a detailed destination data file 58, a destination read out data file 59, and a data file 60 for other uses. Although the information storage unit 50 is generally composed of a photomagnetic recording medium such as a CDROM, and an IC card, the information storage unit 50 may be a magnetic recording medium such as a floppy disk.

In the navigation apparatus having the above-described structure, the map information stored in the information storage unit 50 is read out based on the present position detected by the present position detecting unit 10, and is displayed on the display 42. When a destination is inputted, a route from the present position to the destination is calculated by the information processing/control unit 20, and route guidance is provided by displaying the determined route together with the present position detected by the present position detecting unit 10 (e.g., the GPS receiving unit 14, the relative direction sensor 12, and the distance sensor 13).

For example, when the vehicle is in the middle of the determined route and is away from the previous intersection, the driver may feel uneasy as to whether the vehicle has deviated from the proper route. Therefore, in order to make the driver know that the vehicle is on the proper route, thereby easing the driver's mind, photographic images of characteristic objects existing along the route are read out from photographic data file 55 and are displayed on the display 42. Alternatively, a guidance map is read out from the map data file 51 and is displayed together with the position of the vehicle, thereby informing the driver of the travel position on the route. When the vehicle approaches an intersection, the intersection data file 52 is accessed so as to display the intersection in the form of a graphic image.

Figure 2:
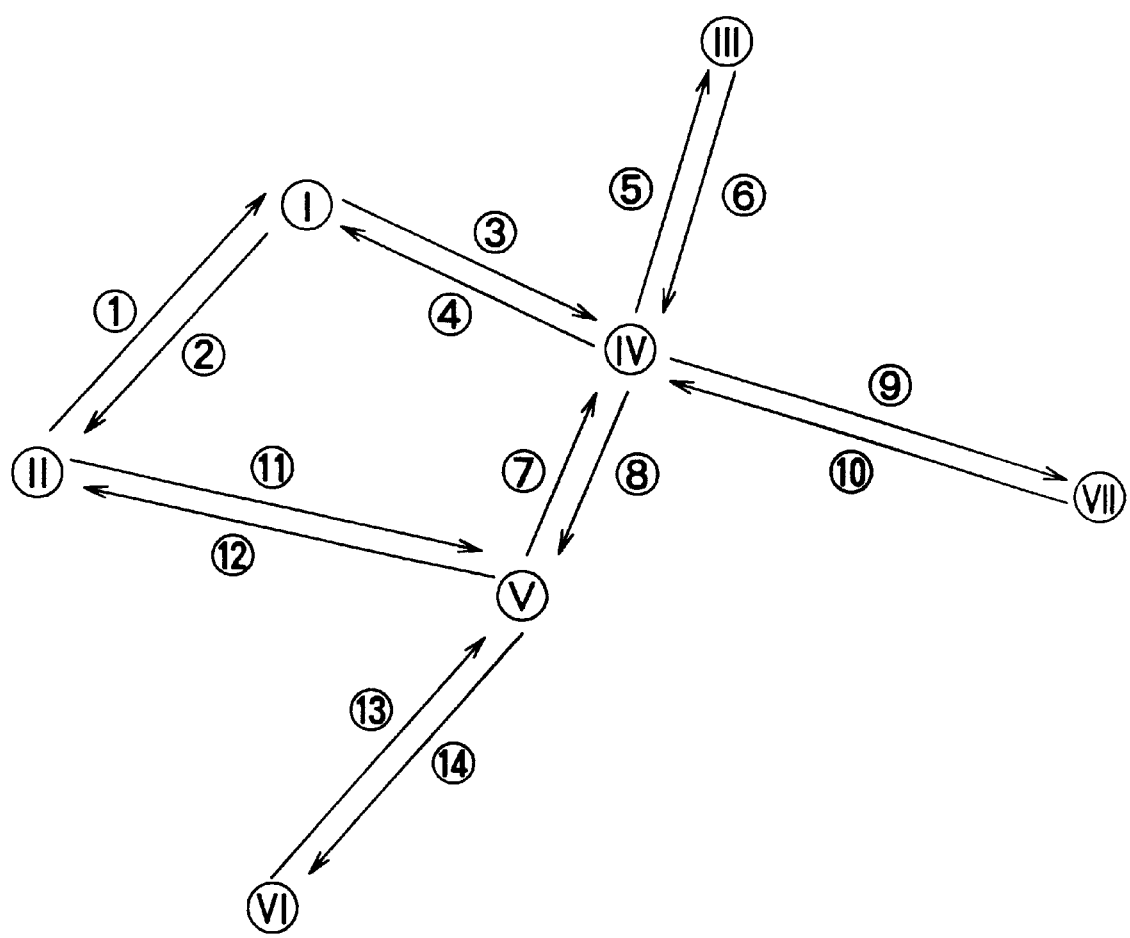
FIG. 2 is an explanatory diagram showing a road network.

When there exists a road network consisting of intersections I–VII and roads 1–14 (illustrated with circles in drawings and underlining in the specification), as shown in FIG. 2, the road network is defined as follows. As shown in FIG. 4, for the road 1, there are inputted the road number 11 of an adjacent road whose start point is the same as that of the road 1, and the road number 4 of another adjacent road whose end point is the same as that of the road 1. Further, in order to define the road 1, the number II of an intersection corresponding to the start point of the road 1, the number I of another intersection corresponding to the end point of the road 1, a node series pointer (AOOO), and the road length (1,000 m) are inputted. This data input is repeated for other roads, thereby defining the road network.

As shown in FIG. 3(a), for each intersection there are stored the intersection number, the coordinates (longitude and latitude) of the intersection, information regarding roads connected to the intersection, and the address and size of landmark (mark pattern) data. As shown in FIG. 3(b), for each landmark, there are stored the coordinates (longitude and latitude) of the landmark, the mark pattern number, and the number of a road along which the landmark exists. (When the landmark is situated at a corner of an intersection, the road numbers of the two roads are stored.)

For example, as shown in FIG. 3(c), mark pattern number "0" is assigned to graphic data for the mark of an AA bank, mark pattern number "I" is assigned to graphic data for the mark of a BB bank, mark pattern number "2" is assigned to graphic data for the mark of a CC bank, mark pattern number "3" is assigned to graphic data for the mark of a DD gas station, and mark pattern number "4" is assigned to graphic data for the mark of an EE gas station.

FIG. 5(a) shows the contents of guidance road data. For each of the roads 1–14 shown in FIGS. 2 and 4, there are stored a length, road attribute data (see FIG. 6(a)), the address and size of shape data, and the address and size of the guidance data. As shown in FIG. 5(b), the shape data include, for example, longitude and latitude data. As shown in FIG. 5(c), the guidance data include the name of an intersection, presence/absence of a traffic signal, landmark data, data regarding a caution point, a road name, the address and size of road name voice data, and the address and size of place-to-go data.

As shown in FIG. 5(d), the place-to-go data include the road number of a road to enter, the name of a place to go, the address and size of voice data for the name of the place to go, the direction-to-go data and travel guidance data. As shown in FIG. 5(e), the direction-to-go data include data indicating one of the following items: −1: invalid, 0: unnecessary, 1:straight, 2: rightward direction, 3: rightward direction with an angle, 4: rightward return direction, 5: leftward direction, 6: leftward direction with an angle, and 7: leftward return direction.

As shown in FIG. 6(a), the road attribute data include elevated/underground data representing whether a road is elevated or is adjacent to an elevated road, or whether the road is an underground road or is adjacent to an underground road, as well as data regarding the number of traffic lanes (i.e., three or more lanes, two lanes, or one lane) or indicating the absence of a centerline.

As shown in FIG. 6(b), the road name data includes a road type and a sub-type number. Examples of the road type include a freeway, an urban freeway, a toll road, and ordinary roads such as a national road, a prefectural (state) road, and other roads. For a freeway, a main road is represented by "1" while a connection road (branch road) for connection to a subsequent road is represented by "2". Respective numbers are assigned to other types of roads.

As shown in FIG. 6(c), the caution point data include data indicating a railroad crossing, the entrance of a tunnel, the exit of a tunnel, or a road-width decreasing point, or data indicating the absence of any caution point.

As shown in FIG. 6(d), the travel guidance data include data indicating rightward offset run, leftward offset run, run at the center, or data indicating the absence of travel guidance.

Next, the operation of the navigation apparatus will be described.

Figure 7:
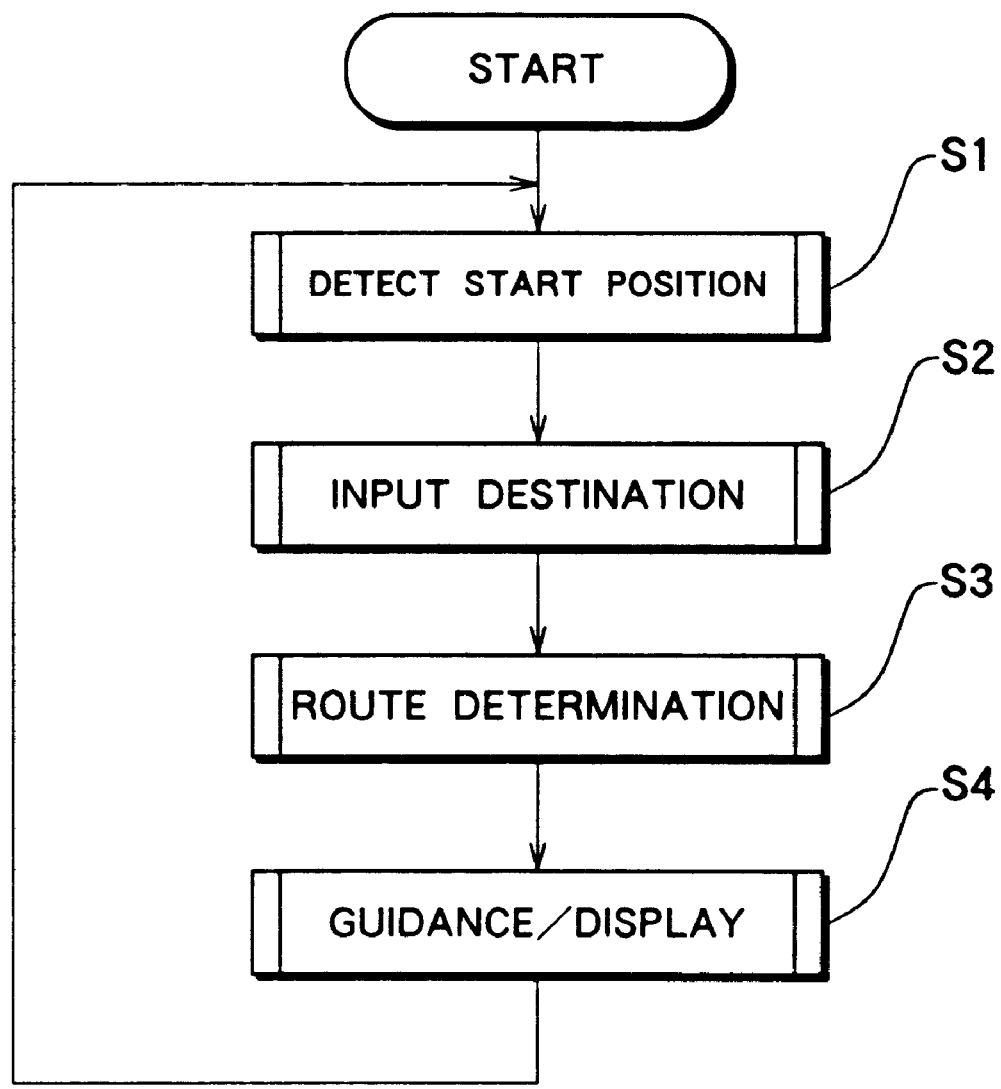
FIG. 7 is a flowchart showing the basic operation of the navigation apparatus of the invention.

FIG. 7 shows a flowchart showing the basic processing for navigation according to the invention.

First, the present position is detected based on the output from the present position detecting unit 10 (step S1). Subsequently, processing for inputting a destination is performed (step S2). The destination can be inputted by selecting one of destinations from a menu displayed on the display 42 through use of the entry device 41. Alternatively, the destination can be selected by inputting a telephone number.

Next, a route up to the destination is determined based on the present position detected by the present position detecting processing and the destination input through destination input processing (step S3). In detail, a node on a road closest to the input destination is calculated. A route from the present position to the calculated node is determined based on determination requirements (for example, the shortest distance, the shortest time, presence/absence or priority of a toll road, ease of traveling). Subsequently, route guidance suitable for the present position is provided based on the route determined by the route determining processing, and the present position detected by the present position detecting means (for example, a GPS, a gyro sensor, or distance sensor) (step S4).

Next, a route re-determination method employed in the navigation apparatus of the present invention will be described.

Figure 8:
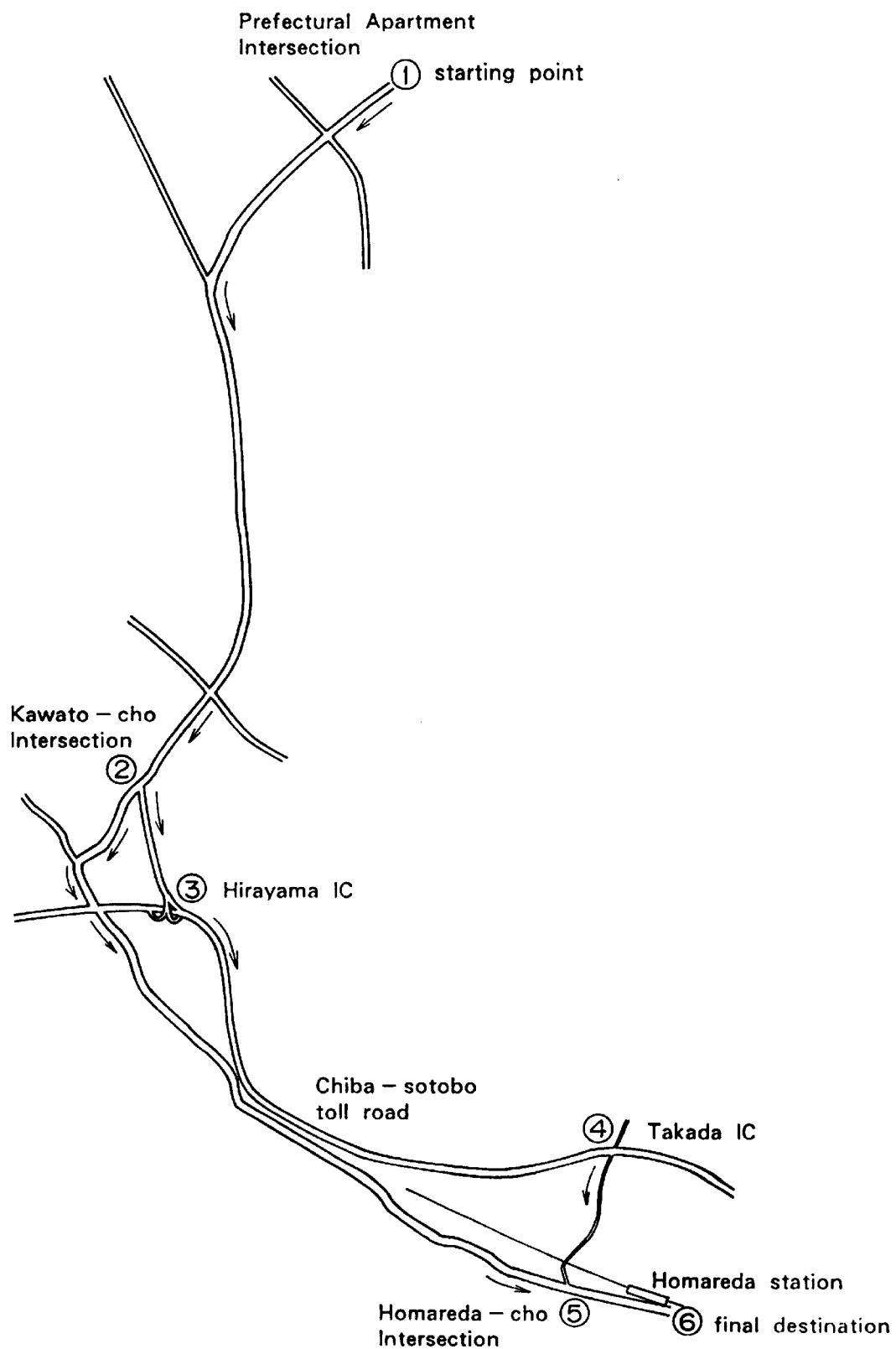
FIG. 8 is a graphical illustration for explaining the route re-determination method used in a navigation apparatus according to a first embodiment of the invention in which an entire route is displayed on a map.

When there is performed a route determination between a starting point 1 to a final destination 6 shown in FIG. 8, one of the following two routes is determined depending on whether a toll road is used.

When a toll road (Chiba-sotobo toll road) is not selected, a route from the start point (Prefectural Apartment Intersection) to the destination (Homareda Station) is determined such that the route passes through enroute point 2 (Kawato-cho Intersection) and enroute point 5 (Homareda-cho Intersection).

When the toll road (Chiba-sotobo toll road) is selected, the route from the start point (Prefectural Apartment Intersection) to the destination (Homareda Station) is determined such that the route passes through enroute point 2 (Kawato-cho Intersection), enroute point 3 (Hirayama IC), enroute point 4 (Takada IC), and enroute point 5 (Homareda-cho Intersection).

In the case where the enroute points vary depending on whether a toll road is selected, and where the route (start point 1—enroute point 2—enroute point 5—final destination 6) is first determined without selecting the toll road, the entire route determination information is stored. For example, this storage of information is performed by selecting a menu item "STORE" in the menu display by using the entry device 41.

When the route must be changed to use the toll road because of, for example, an accident involving heavy congestion or road destruction occurring at Kamatori-cho 2, the route including the toll road, i.e., the route passing through the enroute points 2, 3, 4, and 5, must be selected.

In such a case, stored data regarding the route segments between the start point 1 and the enroute point 2, and that between the enroute point 5 and the final destination 6; that is, non-changing route segments which are not required to change are used as they are. The route segments between the enroute points 2 and 5, which must be changed; that is, the must-change route segments, are disposed of. Instead, new route segments are determined therefor. This newly-determined route segments are combined with the non-changing route segments, so that the route redetermination is completed.

A description will now be given of point data shown in FIG. 9(a). The point data includes data regarding the start point, enroute points, and the destination, which are input through the entry device 41 and which are used to determine a route passing through these points. The point data are stored in storage means such as a RAM, an IC card or a floppy disk. When no enroute points are entered, the point data include only data regarding the start point and the destination.

For each point, there are stored the following four data: (1) a position, i.e., the coordinates (longitude and latitude) of the point; (2) necessity/lack of necessity of guidance for the point; (3) route determining conditions as to whether a toll road is preferentially used and as to whether a different route is to be determined; and (4) a route number which designates one of the route data items, which will be described later.

In the first embodiment, each point (start point, enroute point and destination) is designated based on its respective starting point as a reference. The above-described four data items (1)–(4) are stored for the starting point for each point, while only two data items (1) and (2) are stored for the destination.

Next, a description will be given of the case where two enroute points are designated. In this case, the route from the start point 1 to the destination 4 passes through first and second enroute points 2 and 3. Route segments between 1 and 2, between 2 and 3, and between 3 and 4 must be determined. Therefore, if route determining conditions are set for the starting points of points 1, 2 and 3 of the route segments, route determination can be performed. In other words, the destination 4 is not required to be provided with route determining conditions.

Although the data items (1) and (2), as listed above, are required for each of the points, the data items (3) and (4) are required only for either the starting point or the end point of each route segment. Therefore, the navigation apparatus may be configured to store only the data items (1) and (2) for each starting point. Additionally, only when "Guidance Required" is selected for inputting the data item (2) representing the necessity/lack of necessity of guidance, is the corresponding point utilized as an enroute point during route determination.

The above-described structure allows a user to temporarily remove a certain point through which the user frequently passes from the conditions of route determination. Therefore, such a point can be registered without designating it as an enroute point, so that re-registration of the point becomes unnecessary.

FIG. 9(b) shows route data consisting of information regarding a route determined in the above-described manner. That is, for each route having a corresponding route number, there are stored: (1) the coordinates (longitude and latitude) of the start point of the route; (2) the coordinates (longitude and latitude) of the end point of the route; (3) route determining conditions, and (4) route information, that is, information regarding the route from the start point to the end point (for example, the road number of a road extending from the start point to the end point, the intersection numbers of intersections existing along the route, and a traveled distance).

By storing the results of the route determination for sections between registered points and by editing the route between those points, the entire route to the destination can be calculated.

Figure 10:
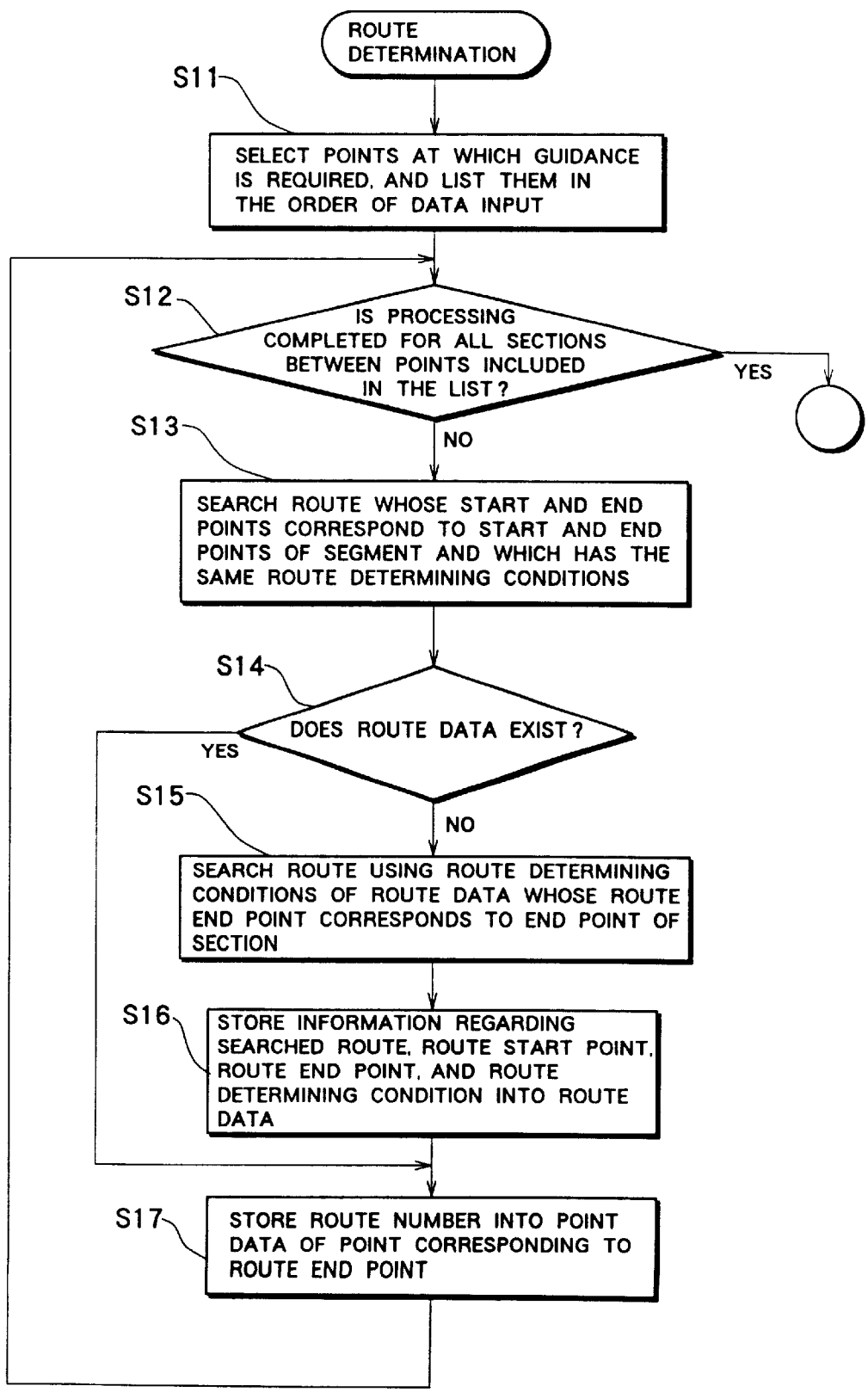
FIG. 10 is a flowchart showing the route redeterminating operation of the navigation apparatus according to the first embodiment of the invention.

Next, the route determining operation of the navigation apparatus according to the present invention will be described with reference to FIGS. 8–10 as well as FIG. 1.

(1) First, data of points for each of which "GuidanceRequired" has been selected in FIG. 9(a)(2) are arranged in the order of input data so as to obtain a list and store it in the RAM 24 (any means capable of temporarily storing information can be used) (step S11).

However, it is possible to re-arrange the order of the enroute points, i.e., by the degree of closeness to the present point based on the coordinates of each enroute point and the present position (or start point), and to make a list using the re-arranged enroute points. Also, the navigation apparatus may have a structure so as to allow a user to select the above-described two kinds of orders, i.e., the order in which the user has inputted data, or the order determined based on the closeness to the present position.

(2) Subsequently, it is determined whether processing has been completed for all the sections between the points included in the list (step S12).

(3) When an affirmative determination is made in step S12, the processing returns to an unillustrated main routine. When a negative determination is made in step S12, route data is searched which contains a route start point and a route end point which correspond to the start point and end point of a road between the two points and which contains the same route determining conditions (step S13)

(4) Subsequently, it is determined whether route data have been found (step S14).

(5) When an affirmative determination is made in step S14, the processing moves to step S17. When a negative determination is made in step S14, a route for the segment between the two points is searched using route determining conditions of route data which are stored for the end point of the route segment (step S15).

(6) Subsequently, information regarding the searched route segment, and the start point and the end point of the route segment, and the route determining conditions are stored as route data (step S16).

(7) Next, the route number is included into the point data of the end point of the route (step S17). The processing then moves back to step S12 so as to repeat the above-described steps.

In the above-described embodiment, the enroute points are changed by storing a new route so that the outs obtained through route determination is replaced with the new route. However, the following method may be used.

When a point is input by a user through entry means which allows the user to input an arbitrary point, it is determined by selecting means whether the input point is used as a destination or an enroute point. Subsequently, a route to the destination is calculated by route calculating means., When an enroute point has been designated, a route which allows the user to reach the destination after passing through the enroute point is calculated.

Since the route determining condition setting means has a structure to allow the user to change the route determining conditions for each section between enroute points, the route determination can be performed in a different manner for each route segment between the enroute points in accordance with the user's desire. For example, in the case where two enroute points are designated, the route determining conditions can be changed such that "an ordinary road is preferentially selected" for section (1) from the start point to the first enroute point; "a toll road is preferentially selected" for section (2) from the first enroute point and the second enroute point; and "an ordinary road is preferentially selected" for section (3) from the second enroute point to the destination. Further, there is provided storage means for storing the results of route determination for each section, and the route is stored for each section. This makes it possible to determine a different route by replacing the original route for the section (2) route, while maintaining the routes for the sections (1) and (3).

As described above, the navigation apparatus according to the present invention has a structure to calculate a route-for each section. Therefore, when the user is not satisfied with a determined route, the user directs a change in the route using modification directing means. As a result, the part of the route which is directed to be changed is calculated again. Subsequently, the re-calculated portion of the route is edited by route editing means so as to update the entire route. Since it is unnecessary to perform recalculation for the entire route to a destination, the route can be calculated within a shortened period of time.

Further, since a route can be stored for each segment and the result of route determination for each section is stored for each of the route determining conditions, an original route need not be calculated again in such a case where the original route is better than the different route. This makes the response of the navigation apparatus quicker.

Next, a method for displaying an intersection map used in the navigation apparatus according to the invention will be described.

Figure 11A:
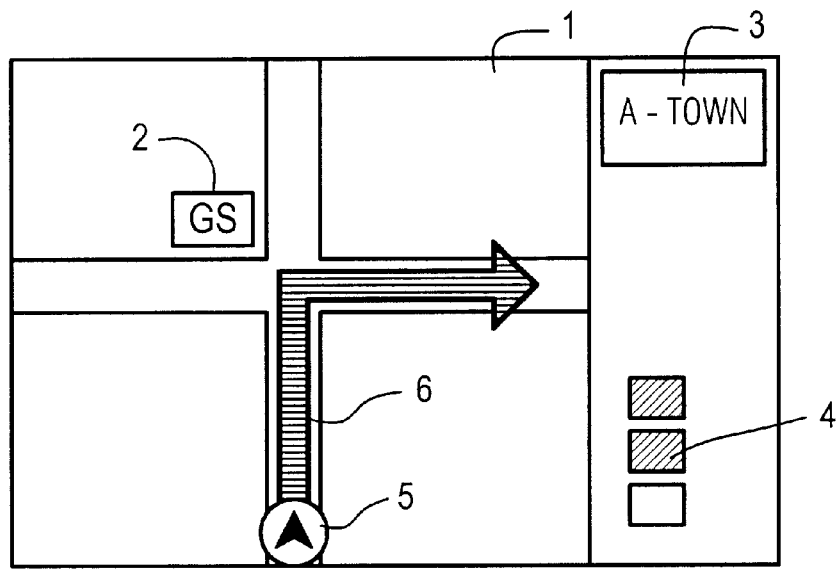
FIG. 11(a) is an illustration showing an intersection diagram displayed on a display of the navigation apparatus according to a second embodiment of the invention in which an intersection is displayed by a first remaining distance display operation.

In FIG. 11(a), numeral 1 denotes an intersection diagram, numeral 2 denotes a gas station serving as a landmark in the vicinity of the intersection, numeral 3 denotes a place-name-displaying section, numeral 4 denotes a remaining-distance display section used in a first remaining-distance display operation, numeral 5 denotes a vehicle position indicating mark used in the first remaining-distance display operation, and numeral 6 denotes an arrow indicating a route at the intersection which is used in the first remaining-distance display operation. The length-of the arrow does not change regardless of advancement of the vehicle.

Figure 11B:
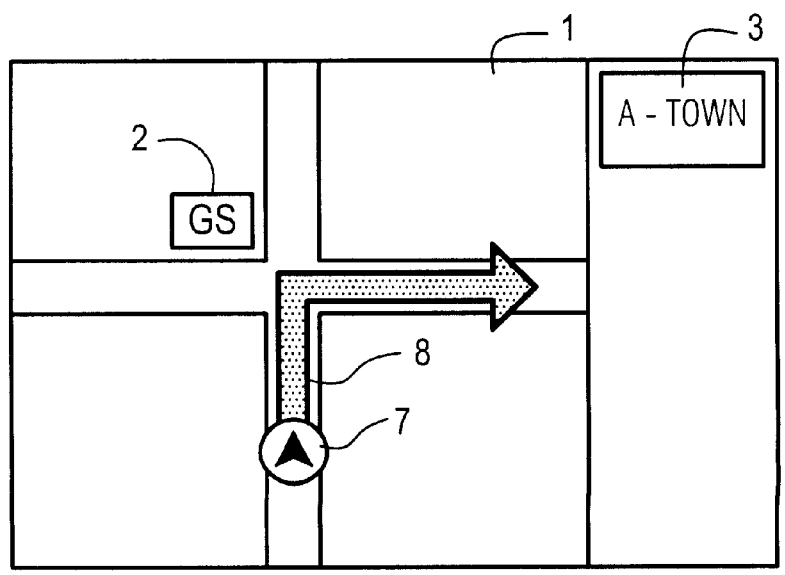
FIG. 11(b) is an illustration showing an intersection diagram displayed on the display of the navigation apparatus according to the second embodiment of the invention in which an intersection is displayed by a second remaining distance display operation.

In FIG. 11(b), numeral 7 denotes a vehicle position indicating mark used in a second remaining-distance display operation, and numeral 8 denotes an arrow indicating a route at the intersection which is used in the second remaining distance display operation. The length of the arrow changes as the vehicle travels.

When the distance between the vehicle and the intersection has decreased to a first predetermined distance, for example, 300 m, a first remaining-distance display is provided as shown in FIG. 11(a). In the first remaining-distance display, the distance between the intersection and the vehicle is displayed at the remaining distance display section 4 as a bar graph. The bar graph changes as the vehicle travels. For example, a yellow bar having a height corresponding to the remaining distance is displayed on a blue background, and the yellow bar is erased by blue color (the background color) as the vehicle advances. It is possible to re-draw the bar graph as the vehicle advances. The decrease in the height of the bar graph allows the user to visually determine that the vehicle is approaching the intersection. At the same time, the route in the vicinity of the intersection is shown by the arrow 6. In this state, however, the vehicle position indicating mark 5 is fixed, and the length of the arrow 6 indicating the route does not change regardless of the advancement of the vehicle.

When the distance between the vehicle and the intersection has decreased to a second predetermined distance, for example, 150 m, a second remaining-distance display is provided as shown in FIG. 11(b). In the second remaining-distance display, the display provided by the remaining-distance display section 4 is removed. This can be performed by coloring the remaining-distance display section 4 with blue (the background color), or by re-drawing the intersection diagram while stopping the drawing of the remaining-distance display section 4. Instead of using the remaining-distance display section 4, the arrow 8 is used for indicating the remaining distance. That is, the vehicle position indicating mark 7 moves as the vehicle advances, so that the base portion of the arrow 8 is gradually erased. This allows the arrow 8 to indicate the remaining distance to the intersection, so that the state in which the vehicle is approaching the intersection is displayed properly.

Since the color of the arrow is changed when the second predetermined distance is reached, it becomes easier to grasp the fact that the remaining distance has decreased to the second predetermined distance. In order to change the color, only the color pallet for the display is changed, or an arrow having a different color is drawn again. For example, a green arrow is displayed during the first remaining-distance display operation, while a yellow arrow is displayed during the second remaining-distance display operation. This makes it easier for the user to determine that the vehicle has entered the second remaining-distance displaying area.

Figure 12B:
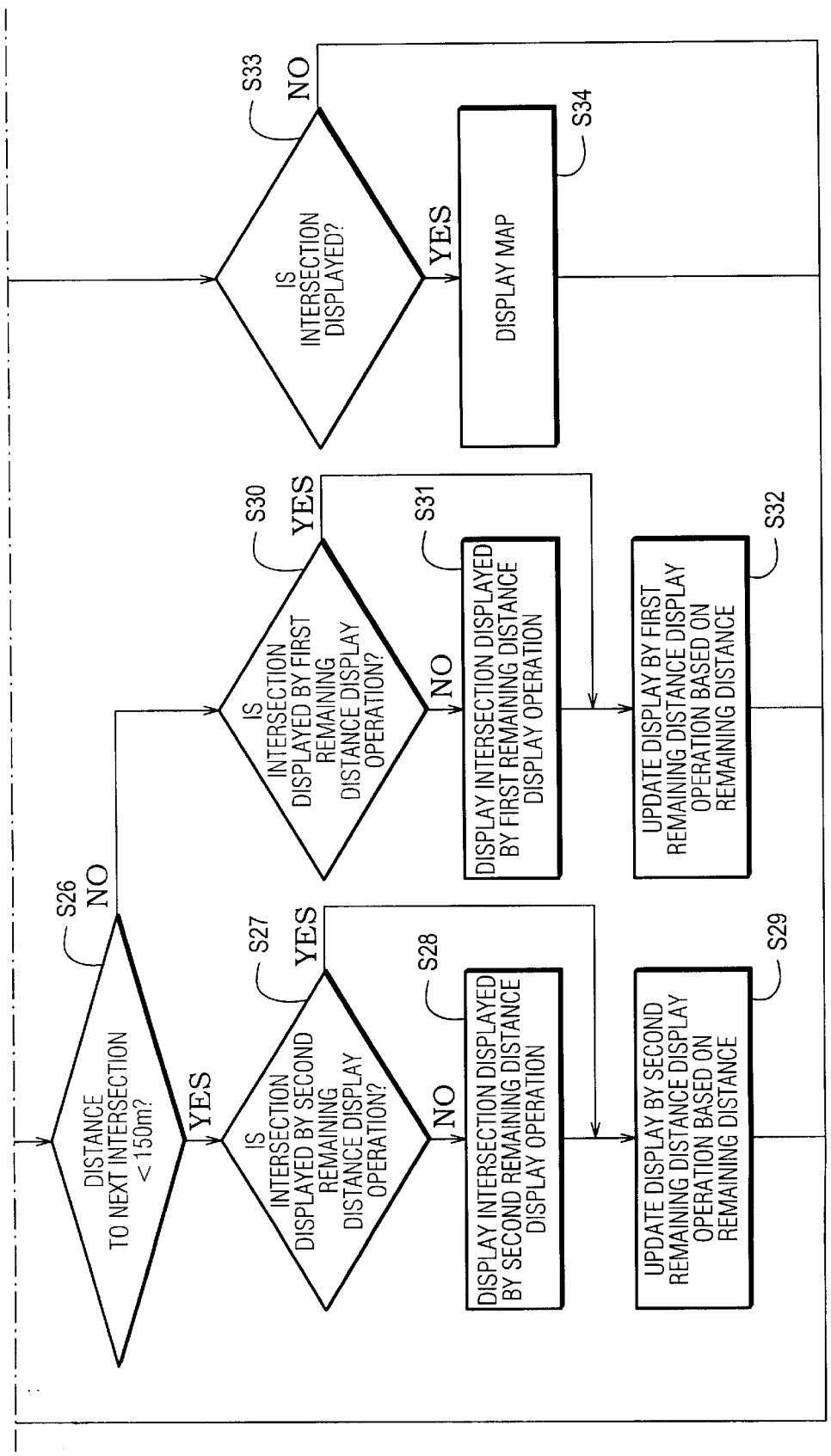
FIG. 12 is a flowchart showing the intersection diagram display operation of the navigation apparatus according to a third embodiment of the invention.

Next, the intersection diagram displaying operation of the navigation apparatus will be described with reference to FIGS. 11(a), 11(b), and 12.

(1) First, the coordinates of a node on a road closest to the coordinates of a destination input through the entry device 41 are searched. The searched node is set as a temporary destination (last guide point) (step S21).

(2) Next, a route to the destination is determined based on the present position detected by the present position detecting means, the temporary destination, and route determining conditions input through the entry means (enroute points, necessity/lack of necessity of preferential use of a toll road, the shortest route, an easy-to-travel road) (step S22).

(3) The present position is obtained from the present position detecting means (step S23).

(4) It is determined, based on the obtained present position and the coordinates of the destination, whether the vehicle has reached the destination (step S24).

(5) When it is determined that the vehicle has not reached the destination, it is determined whether there is less than 300 m distance to a subsequent intersection which is to be displayed for guidance (step S25). Namely, it is determined whether the distance between the vehicle and the intersection has reached the first predetermined distance.

(6) When an affirmative decision is made in step S25, it is determined whether there is less than 150 m distance to the intersection which is to be displayed for guidance (step S26). Namely, it is determined whether the distance between the vehicle and the intersection has reached the second predetermined distance.

(7) When an affirmative determination is made in step S26, it is checked whether the intersection is currently displayed by the second remaining-distance display operation (step S27).

(8) When a negative determination is made in step S27, the intersection is displayed by the second remaining distance display operation (step S28).

(9) Subsequently, the display of the intersection diagram is updated by the second remaining-distance display operation based on the remaining distance (step S29).

(10) When it is determined in step S26 that the distance to the intersection is not less than 150 m, i.e., the distance to the intersection is less than 300 m but equal to or greater than 150 m, it is determined whether the intersection is currently displayed by the first remaining-distance display operation (step S30).

(11) When a determination is made in step S30, the intersection is displayed by the first remaining-distance display operation (step S31).

(12) Subsequently, the display of the intersection diagram is updated by the first remaining-distance display operation based on the remaining distance (step S32).

(13) When a negative determination is made in step S25, it is determined whether the intersection is currently displayed (step S33).

(14) When an affirmative determination is made in step S33, the map is displayed (step S34).

When the vehicle has passed through the intersection, the processing moves back to step S23.

In the invention, when the distance between the present position of a vehicle and an intersection reaches the first predetermined distance or the second predetermined distance, the manner of displaying the remaining distance is changed so as to provide display for guidance which is easy for a user to view.

The invention is not limited to the above-described embodiments. Numerous modifications and variations of the invention are possible in light of the spirit of the invention, and they are not excluded from the scope of the invention.

What is claimed is:

1. A navigation apparatus for a vehicle, comprising:

information storage means for storing information regarding roads and intersections;

present position detecting means for detecting the present position of the vehicle;

destination setting means for setting a destination;

enroute point setting means for setting enroute points to be passed through;

route calculating means for calculating a route to the destination set by said destination setting means based on the information stored in said information storage means and the enroute points set by said enroute point setting means;

route storage means for storing the route calculated by said route calculating means; and route guidance means for providing route guidance based on the route calculated by said route calculating means and the present position detected by said present position detecting means, wherein said route storage means stores each section of the route between enroute points, said route calculating means that performs partial route recalculation for each section between the enroute points on demand and enables a user to modify the entire route by individually retrieving and editing each stored section between the enroute points and route guidance is determined and edited individually for each section defined by a plurality of the enroute points set between a start point and the destination, such that when a user changes the original calculated route, the enroute point before the section to be edited is designated as "ROUTE START POINT" and the enroute point after the section to be edited is designated as "ROUTE END POINT", and only the edited section of the entire route is recalculated in determining the modified route.

2. A navigation apparatus for a vehicle, comprising:

information storage means for storing information regarding roads and intersections;

present position detecting means for detecting the present position of the vehicle;

destination setting means for setting a destination;

enroute point setting means for setting enroute points to be passed through;

route calculating means for calculating a route for each section between the present position of the vehicle detected by said present position detecting means, based on information stored in said information storage means, the enroute point set by said enroute point setting means, and the destination set by said destination setting means;

route storage means for storing each section of the route calculated by said route calculating means; and route change directing means for directing a change in the route for each of said sections, wherein said route calculation means is provided with route recalculation means that performs partial route recalculation for each stored section that is designated by a user to be changed, and route editing means for editing the entire route from the present position of the vehicle to the destination by individual retrieving and editing each section between enroute points, said route storage means stores the route edited by said route editing means and is provided with route guidance means for providing route guidance based on the route stored in said route storage means and the present position of the vehicle detected by said present position detecting means, and route guidance is determined and edited individually for each section defined by a plurality of the enroute points set between a start point and the destination, such that when a user changes the original calculated route, the enroute point before the section to be edited is designated as "ROUTE START POINT" and the enroute point after the section to be edited is designated as "ROUTE END POINT", and only the edited section of the entire route is recalculated in determining a modified route.

3. A navigation apparatus for a vehicle in which an entire route from a start point to a destination is determined and the vehicle is guided to the destination in accordance with the determined route, said navigation apparatus comprising:

means for setting a plurality of enroute points located between the start point and the destination so that sections are defined among the start point, the enroute points, and the destination;

means for setting different conditions for each section;

means for determining a route segment for each section based on the conditions set for the section;

means for storing each section of the route determined by said determining means;

means for determining the entire route to the destination by individually retrieving and editing each stored section between enroute points; and means for individually selecting and editing the sections and the route segments by a user, such that when a user changes the original calculated route, the enroute point before the section to be edited is designated as "ROUTE START POINT" and the enroute point after the section to be edited is designated as "ROUTE EIND POINT", and only the route in the edited section of the entire route is recalculated in determining a modified route.

* * * * *